(12) United States Patent
Kang et al.

(10) Patent No.: US 10,293,287 B2
(45) Date of Patent: May 21, 2019

(54) WATER FILTER ASSEMBLY

(71) Applicant: MCM CO., LTD., Chungcheongbuk-do (KR)

(72) Inventors: Chan Suk Kang, Chungcheongbuk-do (KR); Yong Seok Kim, Chungcheongbuk-do (KR); Yong Hwan Cho, Chungcheongbuk-do (KR)

(73) Assignee: MCM CO., LTD., Chungcheongbuk-Do (KR)

( * ) Notice: Subject to any disclaimer, the term of this patent is extended or adjusted under 35 U.S.C. 154(b) by 41 days.

(21) Appl. No.: 15/307,578

(22) PCT Filed: Apr. 29, 2015

(86) PCT No.: PCT/KR2015/004306
§ 371 (c)(1),
(2) Date: Oct. 28, 2016

(87) PCT Pub. No.: WO2015/167248
PCT Pub. Date: Nov. 5, 2015

(65) Prior Publication Data
US 2017/0056797 A1    Mar. 2, 2017

(30) Foreign Application Priority Data

Apr. 30, 2014 (KR) .......................... 10-2014-0052153

(51) Int. Cl.
*B01D 35/157* (2006.01)
*B01D 35/147* (2006.01)
(Continued)

(52) U.S. Cl.
CPC ............ *B01D 35/157* (2013.01); *B01D 35/00* (2013.01); *B01D 35/147* (2013.01); *B01D 35/30* (2013.01); *B01D 35/306* (2013.01)

(58) Field of Classification Search
CPC .... B01D 35/157; B01D 35/30; B01D 35/147; B01D 35/00
(Continued)

(56) References Cited

U.S. PATENT DOCUMENTS

2001/0005985 A1    7/2001   Schueler

FOREIGN PATENT DOCUMENTS

| JP | 2001221117 A | 8/2001 | |
| KR | 100668767 B1 * | 1/2007 | ............. B01D 35/14 |

(Continued)

*Primary Examiner* — Madeline Gonzalez
(74) *Attorney, Agent, or Firm* — Nath, Goldberg & Meyer; Jerald L. Meyer; Stanley N. Protigal

(57) ABSTRACT

In the water filter assembly, the flow path could be changed to the bypass flow path or the purified water flow path, when the inner moves upwardly and downwardly in the filter head by combining or separating of the filter body and filter head. The inner is movably inserted to the filter head. The elastic member changes the flow path to bypass flow path when the filter body is separated by elastic biasing the inner between the filter head and the inner to downward direction of the filter head. If the user pushes the inner to the inside of the filter head by mistake when the filter body is separated from the filter head, the inner is pushed out to be the original position, so that the filter body can be rapidly combined to the filter head including the inner.

12 Claims, 17 Drawing Sheets

(51) Int. Cl.
*B01D 35/30* (2006.01)
*B01D 35/00* (2006.01)

(58) Field of Classification Search
USPC ....... 210/235, 440, 442, 443, 444, 234, 445, 210/418
See application file for complete search history.

(56) References Cited

FOREIGN PATENT DOCUMENTS

KR 100668767 B1 1/2007
KR 101311654 B1 9/2013

* cited by examiner

【Figure 1】
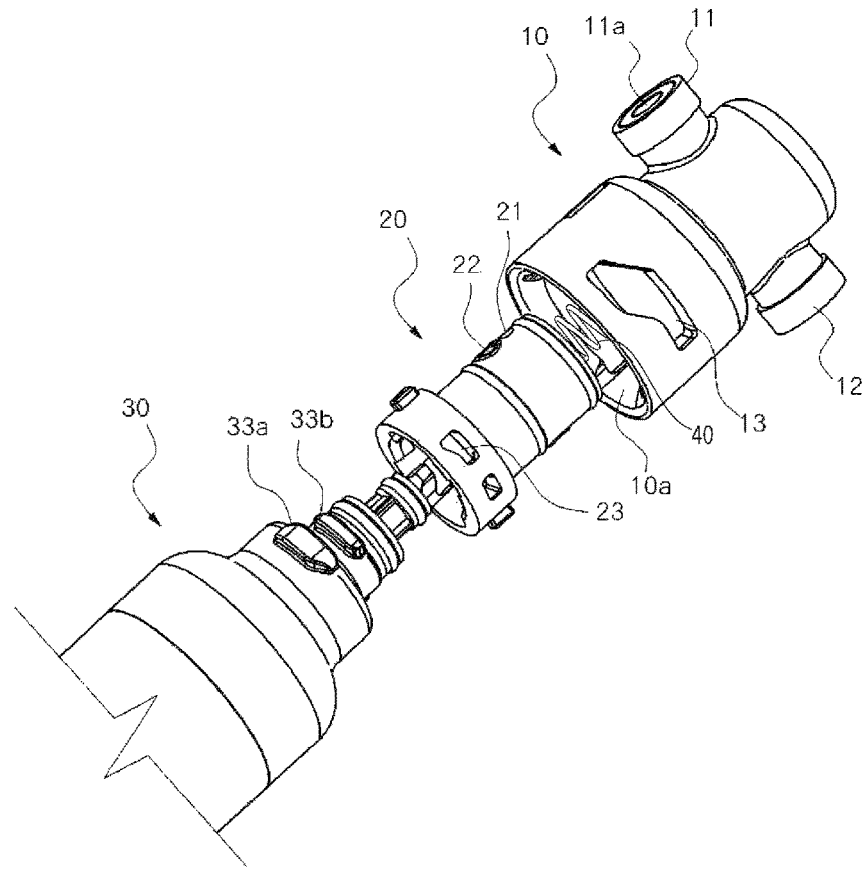
【Figure 2】
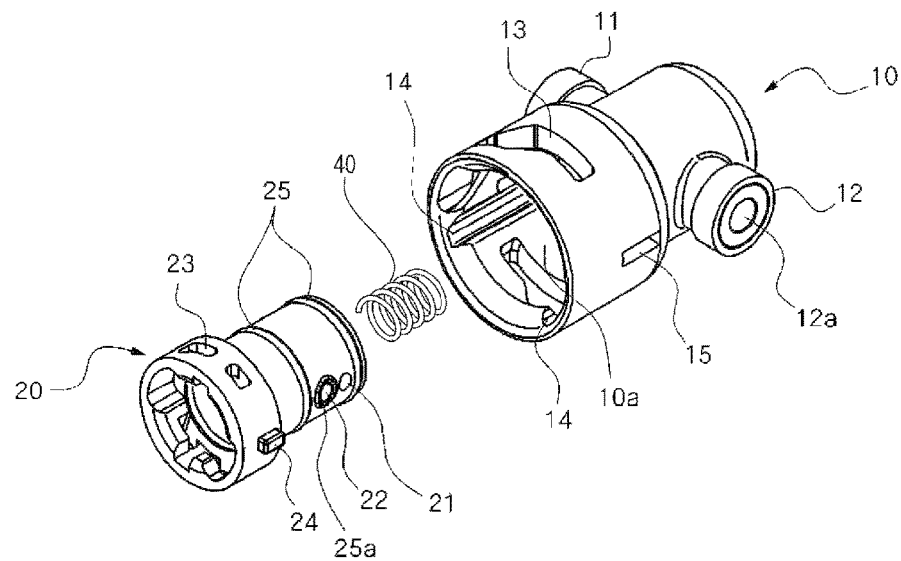

[Figure 3]
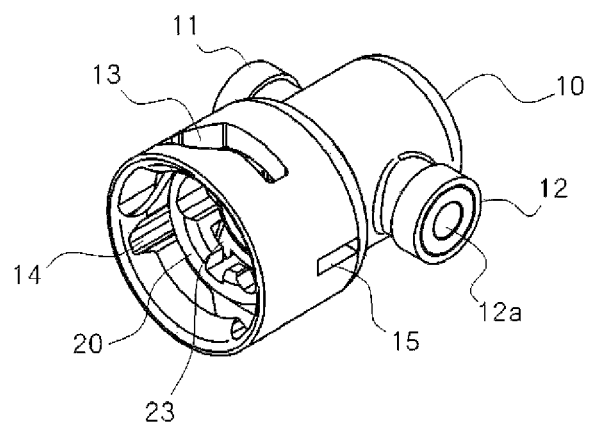

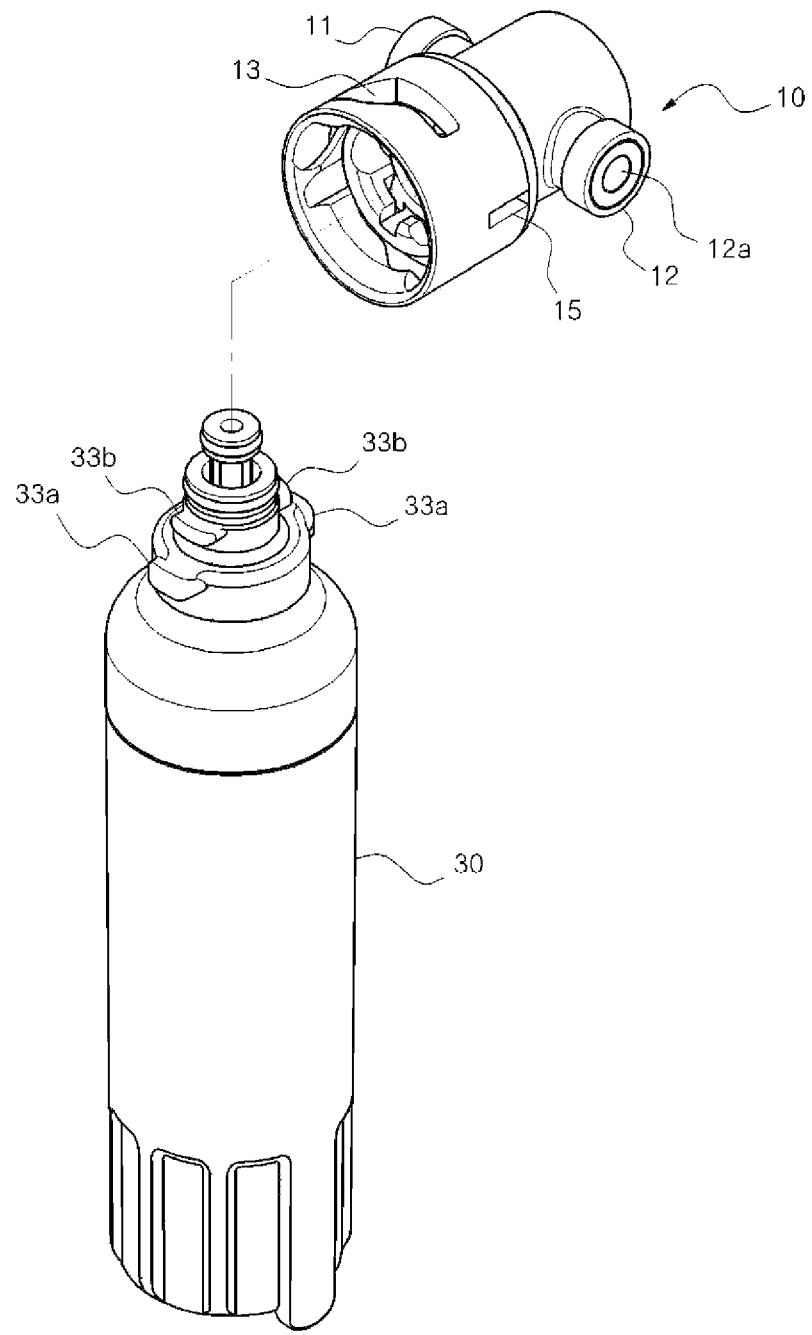
【Figure 4】

[Figure 5]
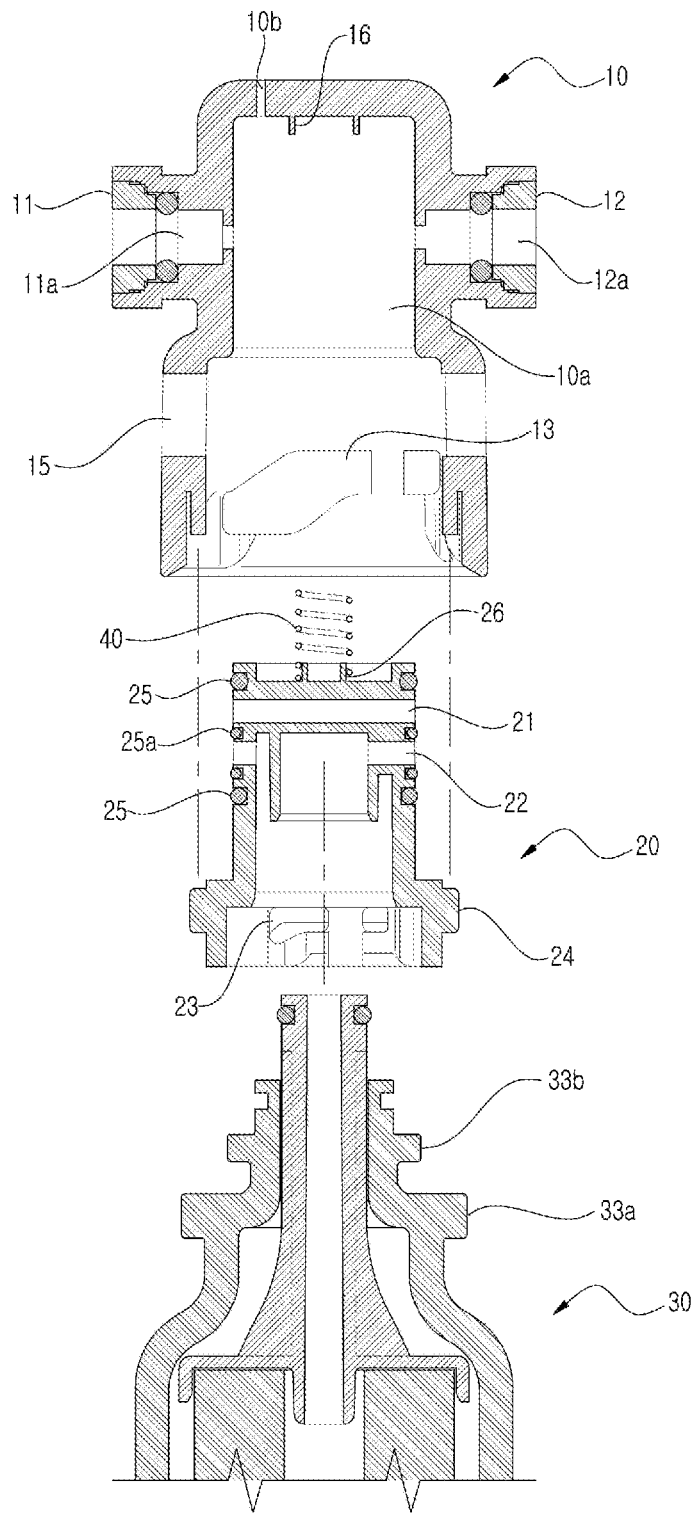

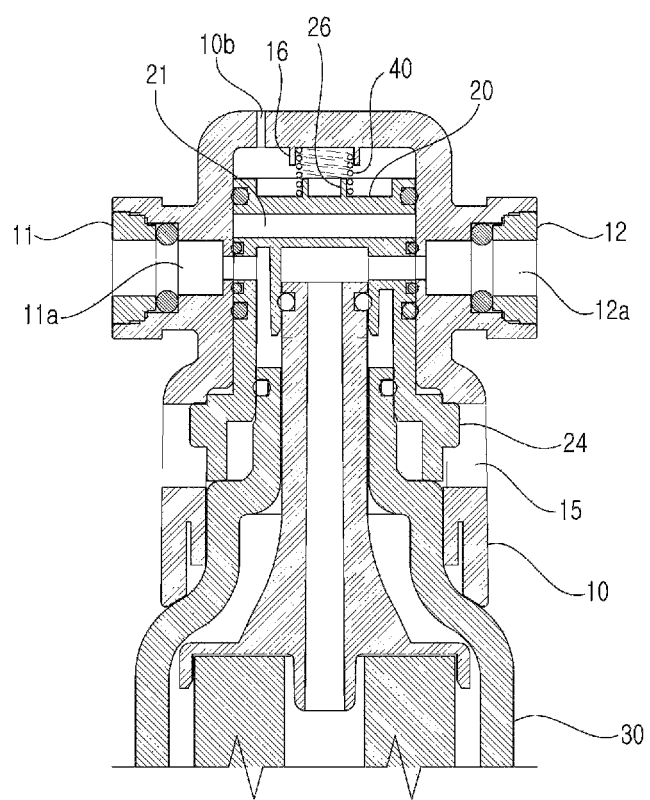
[Figure 6]

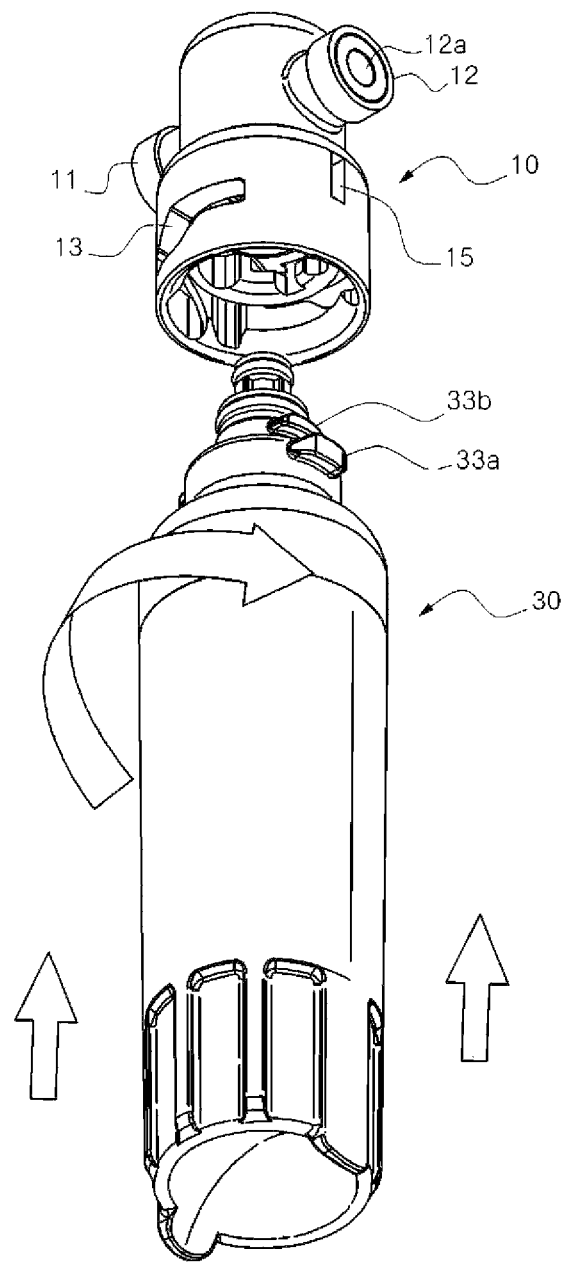
[Figure 7]

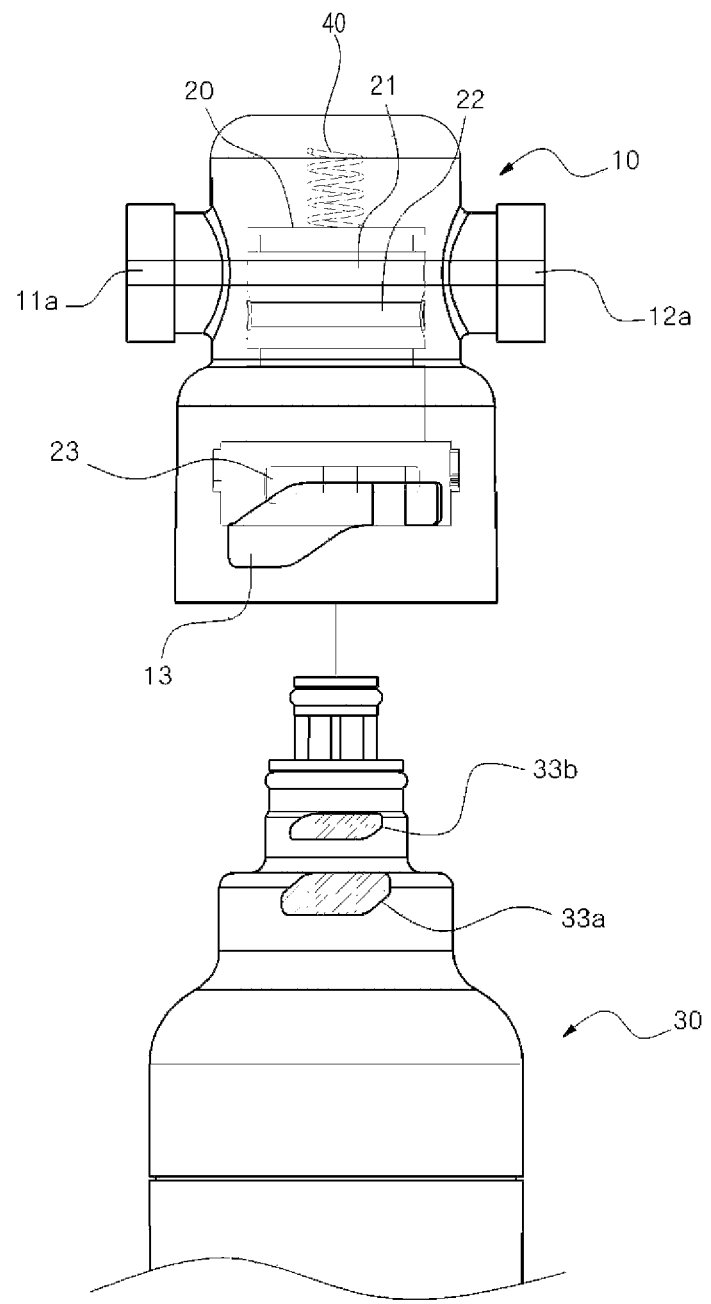
[Figure 8]

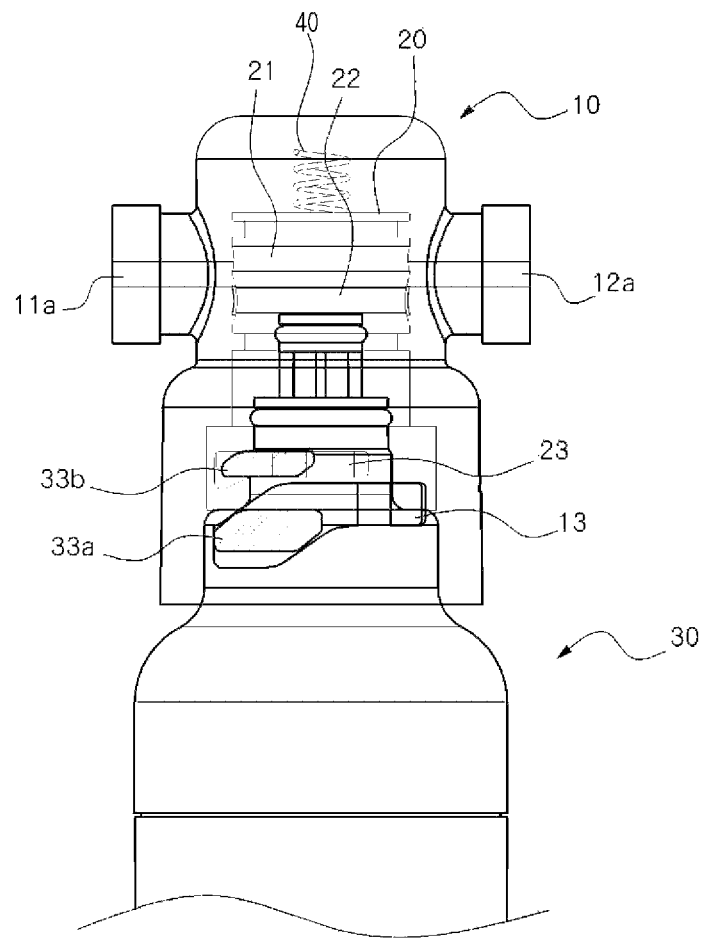

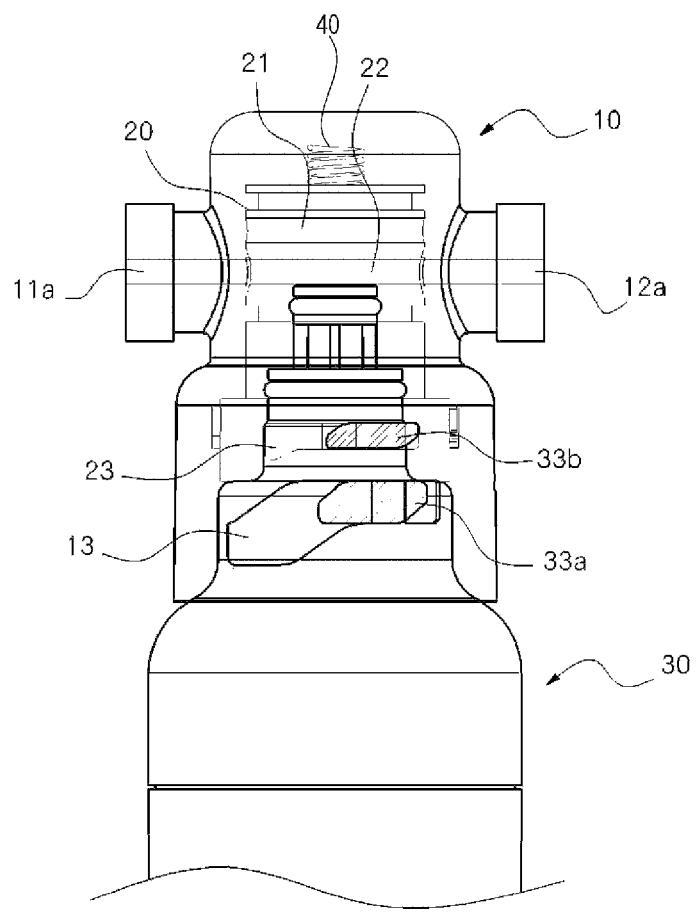
【Figure 10】

[Figure 11]
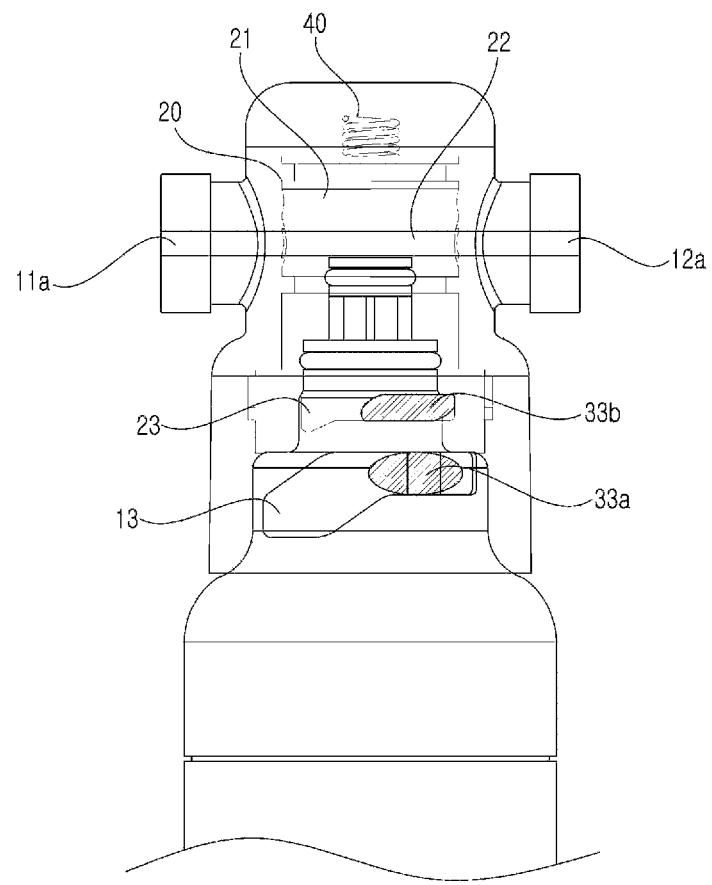

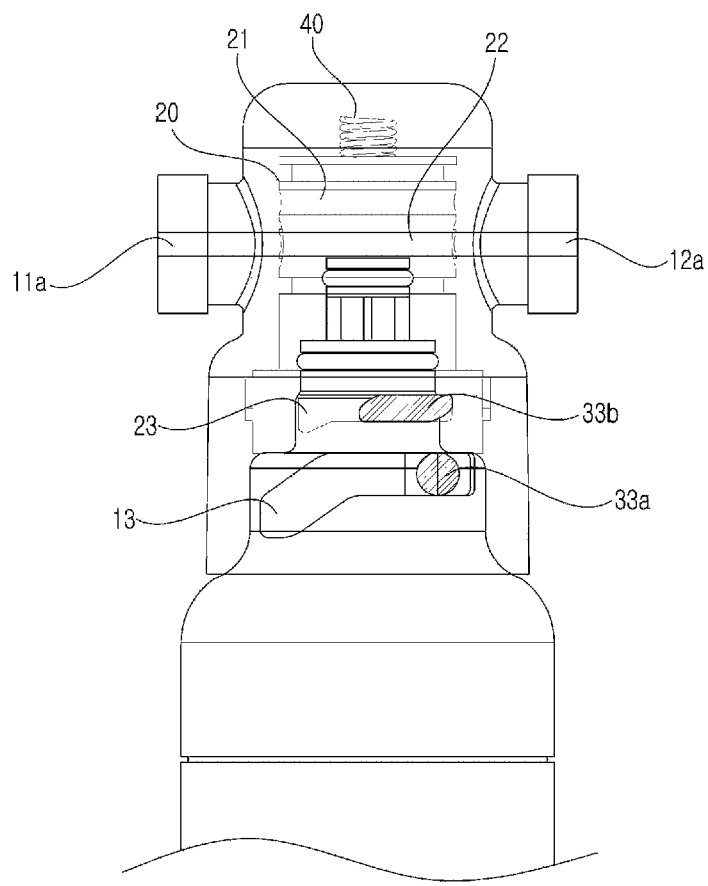
【Figure 12】

【Figure 13】
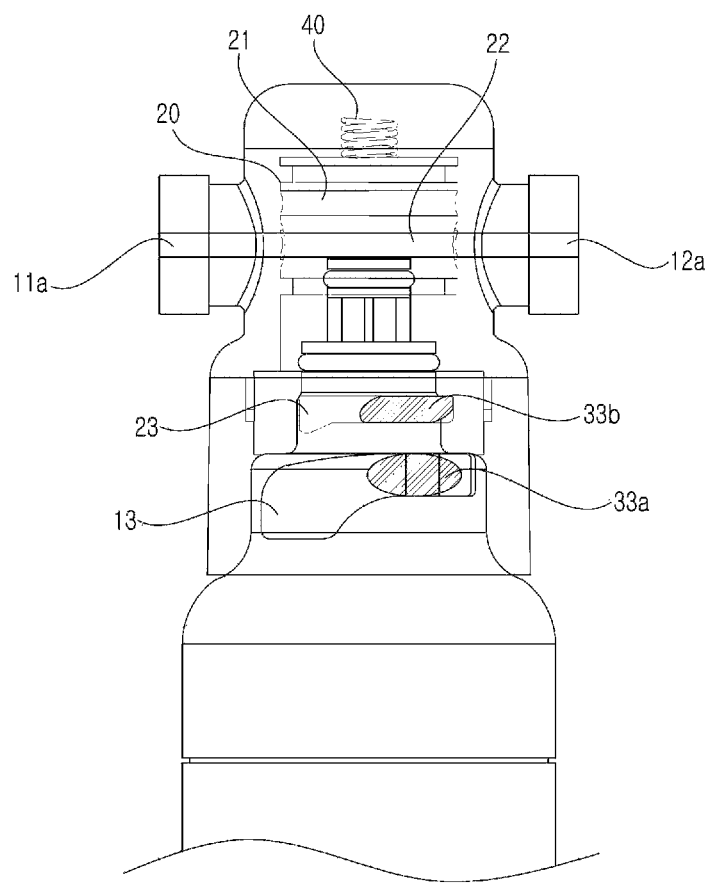

【Figure 14】
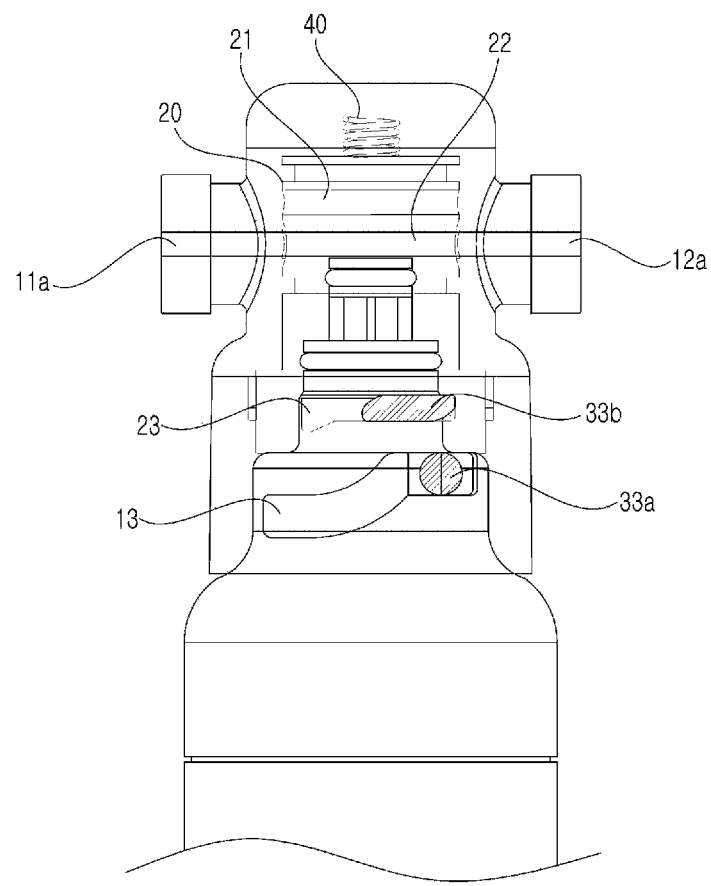

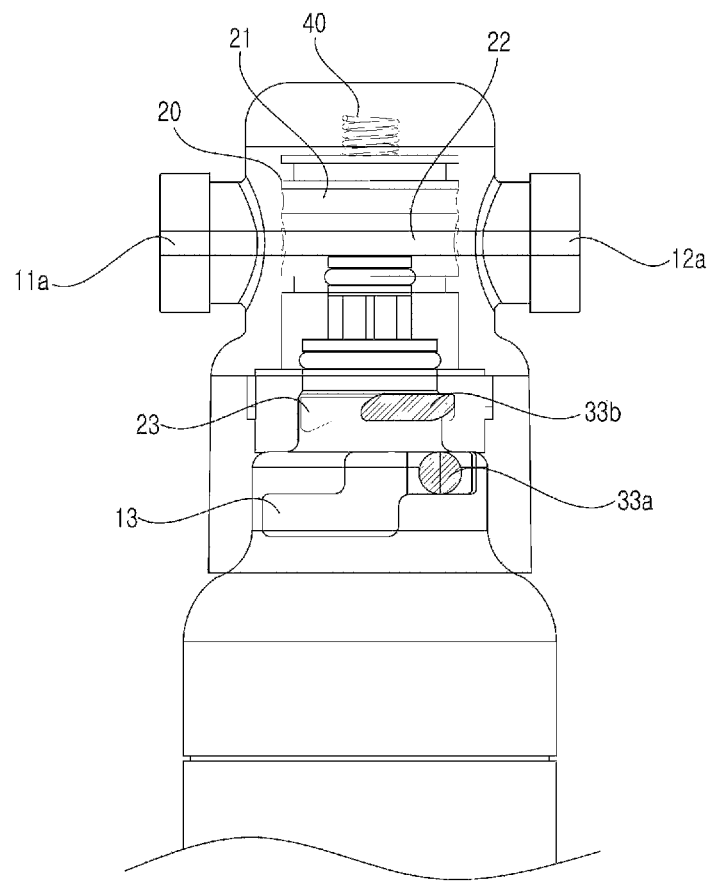
[Figure 15]

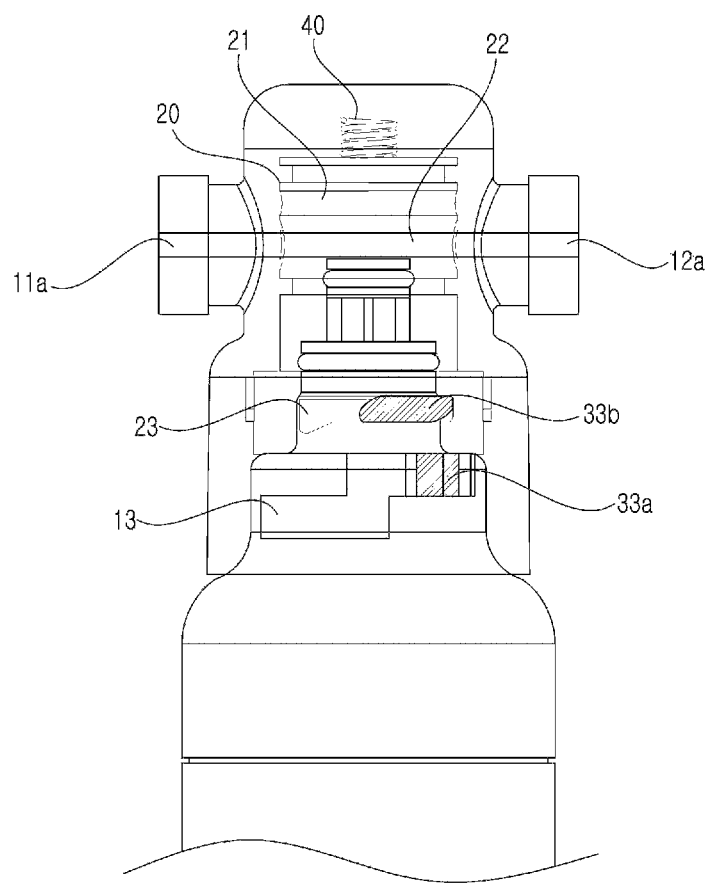
[Figure 16]

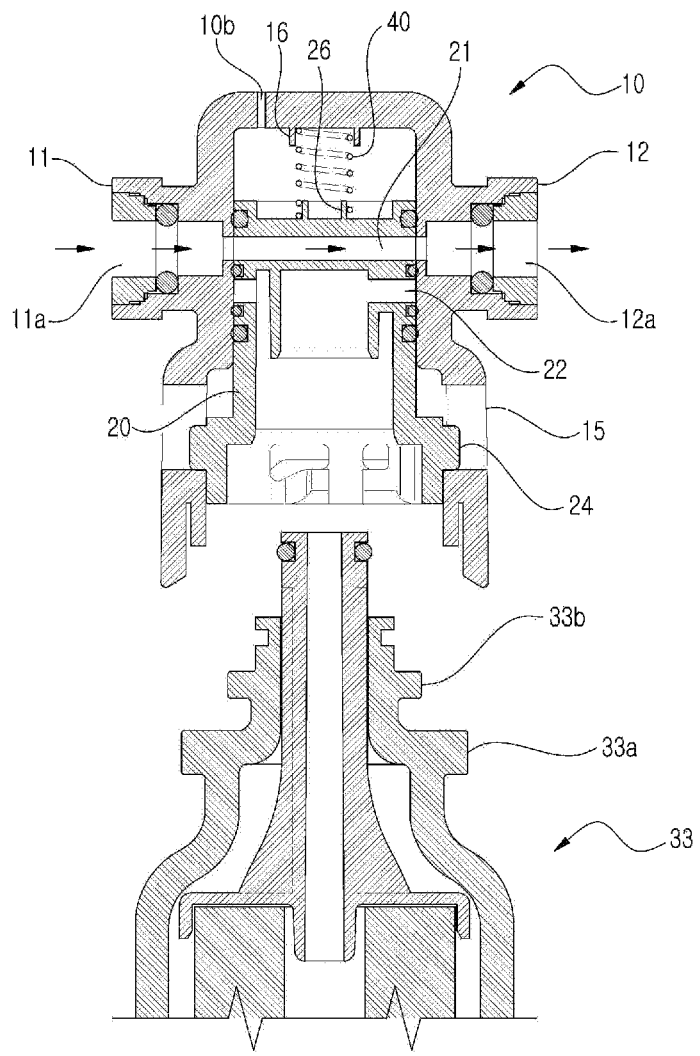
[Figure 17]

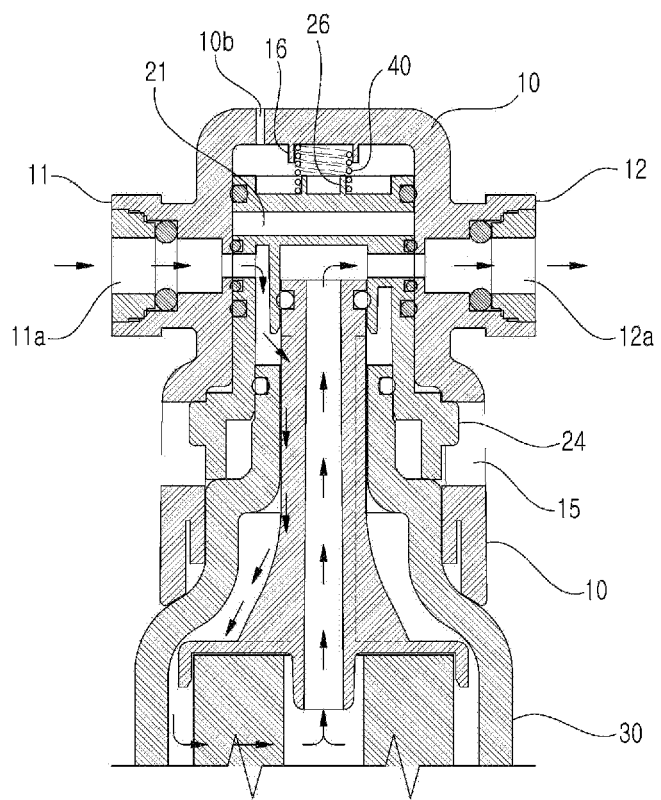
[Figure 18]

WATER FILTER ASSEMBLY

This is a National Phase Application filed under 35 U.S.C. 371 as a national stage of PCT/KR2015/004306, filed Apr. 29, 2015, an application claiming the benefit of Korean Application No. 10-2014-0052153, filed Apr. 30, 2014, the content of each of which is hereby incorporated by reference in its entirety.

TECHNICAL FIELD

The present invention relates to a filter assembly mounted on a purified water line, and especially relates to a filter assembly configured to automatically convert a fluid flow path to a bypass fluid flow path or a purified fluid flow path when an inner moves upward or downward within a filter head by engaging or disengaging the filter body with respect to the filter head having the inner inserted.

BACKGROUND ART

Generally, a purifier comprises many kinds of filters such as, carbon filter, membrane, etc. in according to the use. The water is purified by passing through the filters with physical and chemical process.

This kind of filter has an inlet receiving water with filter head and an outlet outputting the purified water. A plurality of purifier filters are connected by connecting pipes to each inlet and outlet. The filters purify the water provided from the water source with the multi-phased purifying and supply the purified water to the water tank of the purifier.

The purifier has a check valve in the filter head. The outlet is by directly connected to the inlet of the filter head. When the filter is removed from the filter head, the filter prevents the water from leaking by connecting the inlet of the filter head and the outlet and has a bypass function to secure a flow path of the purifying line.

However, the check valve basically needs an elastic body such as a metal spring. Therefore, it would be polluted by a corrosion of the metal spring and does not work properly by a decline of an elastic force of the metal spring due to long period usage.

As a solution for this problem, KR Patent No. 10-1311654 (2013 Sep. 16.) discloses a filter assembly having a flow path changing function to automatically change the flow path to bypass flow path. The filter assembly includes guides at a filter head and an inner respectively in which the filter head has the inner including two flow paths at inside. There are two keys which can be connected to the filter head and the inner respectively at upper part of the filter body. The inner can be moved upwardly and downwardly at inside of the filter head by the detachment of the filter body and the filter head. Therefore, the flow path can be simply changed by the detachable structure of filter body and filter head without an extra elastic member. For convenience of producing and using the filter assembly, the assembling can be simplified by minimum quantity of segments.

DISCLOSURE

Technical Problem

However, in the case of the filter assembly of the prior art, if the user inadvertently pushes the inner into the interior of the filter head when the filter body is separated from the filter head, the inner can't be pushed back out from the filter head. Therefore it is difficult to connect the filter body to the filter head including the inner.

Technical Solution

In the present invention, if the user pushes the inner to the inside of the filter head by mistake when the filter body is separated from the filter head, the inner is pushed out to be the original position, so that the filter body can be rapidly combined to the filter head including the inner.

The present disclosure is directed to a water filter assembly comprising a filter head including an inlet formed at one side, an outlet formed at the opposite side of the inlet, hollow area formed at an inside to connect the inlet and the outlet, and a head key guide formed at an inside face; an inner including a bypass flow path formed at upper side, a purified water flow path formed at the bypass flow path and an inner key guide formed at inside, the inner being inserted to the hollow area of the filter head to move upwardly and downwardly; a filter body to change the water flow path to connect the purified water flow path by moving the inner from hollow area to upper part by being connected to the filter head having the inserted inner and to change the water flow path to connect the bypass flow path by moving the inner from hollow area to lower part by being connected to the filter head by being separated from the filter head having the inserted inner, the filter body including an inner key detachably connected to the inner key guide at upper part and a head key detachably connected to the head key guide at lower part; and an elastic member being positioned between the filter and the inner, the elastic member moving downwardly to keep the elasticity.

In another representative, preferred embodiment, the height and the diameter of the head key guide are respectively larger than the height and the diameter of the inner key guide.

In another representative, preferred embodiment, the water filter assembly further comprises a vertical guide hole formed in upward and downward direction in inside of the filter head; and a guide pin interlocking with the vertical guide hole in outside of the inside of cylindricalness of the inner; wherein the inner assembled to the filter head by being vertically inserted into.

In another representative, preferred embodiment, the filter head includes an inner locking hole formed at the upper lateral part of the vertical guide hole, and the inner locking hole is vertically formed to guide the up and down movement of the guide pin.

In another representative, preferred embodiment, an undercut unit is formed between the vertical guide hole and the inner locking hole and the undercut unit is supported by the guide pin, and wherein the inner is forcibly assembled into the filter head and prevented not to be separated.

In another representative, preferred embodiment, the water filter assembly further comprises a ventilation hole penetrably formed at an upper part of the filter head to inlet and outlet the air.

In another representative, preferred embodiment, the elastic member is a coil spring.

In another representative, preferred embodiment, a first spring supporter is located at the upper part of the inside of the filter head and the upper part of elastic member is inserted to support the first spring supporter, and wherein a second spring supporter is located at the upper face of the inner and the bottom area of the elastic member is inserted to support the second spring supporter.

In another representative, preferred embodiment, the head key guide is formed as a dual raised spot including an inclined route; and wherein the head key is formed as a protrusion including an inclined plane corresponding to the inclined route to move along to the head key guide.

In another representative, preferred embodiment, the head key guide is formed as a dual raised spot including an inclined route; and wherein the head key is formed as a protrusion including an oval cross-section to move along to the head key guide.

In another representative, preferred embodiment, the head key guide is formed as a dual raised spot including an inclined route; and wherein the head key is formed as a protrusion including a circular cross-section to move along to the head key guide.

In another representative, preferred embodiment, the head key guide is formed as a dual raised spot including a circular route; and wherein the head key is formed as a protrusion including an oval cross-section to move along to the head key guide.

In another representative, preferred embodiment, the head key guide is formed as a dual raised spot including a circular route; and wherein the head key is formed as a protrusion including a circular cross-section to move along to the head key guide.

In another representative, preferred embodiment, the head key guide is formed as a dual raised spot including a vertical route; and wherein the head key is formed as a protrusion including a circular cross-section to move along to the head key guide.

In another representative, preferred embodiment, the head key guide is formed as a dual raised spot including a vertical route; and wherein the head key is formed as a protrusion including a rectangular cross-section to move along to the head key guide.

In another representative, preferred embodiment, the flow path can be changed to the bypass flow path or the purified water flow path, when the inner moves upwardly and downwardly in the filter head by combining or separating of the filter body and filter head. The inner is movably inserted to the filter head. The elastic member changes the flow path to bypass flow path when the filter body is separated, by elastically biasing the inner between the filter head and the inner downward with respect to the filter head. If the user inadvertently pushes the inner into the interior of the filter head when the filter body is separated from the filter head, the inner is pushed out to be the original position, so that the filter body can be rapidly combined to the filter head including the inner.

DESCRIPTION OF DRAWINGS

The above and/or other aspects will become apparent and more readily appreciated from the following description of the exemplary embodiments, taken in conjunction with the accompanying drawings, in which:

FIG. 1 is a perspective view of a structure of the water filter assembly according to one embodiment of the present invention.

FIG. 2 is a perspective view of a structure of a filter head of the water filter assembly according to one embodiment of the present invention.

FIG. 3 is a perspective view of a structure of an inner of the water filter assembly according to one embodiment of the present invention.

FIG. 4 is a disassembled perspective view of the filter head and filter body of the water filter assembly according to one embodiment of the present invention.

FIG. 5 is a cross-sectional diagram of the water filter assembly according to one embodiment of the present invention.

FIG. 6 is a combination diagram of the water filter assembly according to one embodiment of the present invention.

FIG. 7 is a constitutional diagram showing a combination method of the water filter assembly according to one embodiment of the present invention.

FIG. 8 to FIG. 10 are schematic diagrams showing combined states in which the head key connected to the head key guide and the inner key connected to the inner key guide of the water filter assembly according to one embodiment of the present invention.

FIG. 11 to FIG. 16 are schematic diagrams of various embodiments of the head key guide and the head key of the water filter assembly of the present invention.

FIG. 17 is a cross-sectional diagram of the combined state in which the bypass flow path of the filter assembly according to one embodiment of the present invention.

FIG. 18 is a cross-sectional diagram of the combined state in which the purified water flow path of the water filter assembly according to one embodiment of the present invention.

BEST MODE

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

In the filter assembly according to one embodiment of the present invention, the inner 20 is movably inserted to the filter head 10. Therefore, the flow path could be automatically changed to the bypass flow path 21 or the purified water flow path 22, when the inner 20 moves upwardly and downwardly in the filter head 10 by combining or separating of the filter body 30 and filter head 10. The elastic member 40 is located between filter head 10 and inner 20. If the user pushes the inner 20 to the inside of the filter head 10 by mistake when the filter body 30 is separated from the filter head 10, the inner 20 is pushed out to be the original position, so that the filter body 30 can be rapidly combined to the filter head 10 including the inner 20.

As shown in FIG. 1 to FIG. 16, the filter assembly comprises the filter head 10 including an inlet 11 forming an inlet flow path 11a at one side, an outlet 12 forming outlet flow path 12a at the opposite side, hollow area 10a formed at an inside to connect the inlet 11 and the outlet 12, and a head key guide 13 formed at an inside face, the inner 20 including a bypass flow path 21 formed at upper side, a purified water flow path 22 formed at the bypass flow path 21 and an inner key guide 23 formed at inside, the inner 20 being inserted to the hollow area 10a of the filter head 10 to move upwardly and downwardly; the filter body 30 to change the water flow path to connect the purified water flow path 22 by moving the inner 20 from hollow area 10a to upper part by being connected to the filter head 10 having the inserted inner 20 and to change the water flow path to connect the bypass flow path 21 by moving the inner 20 from hollow area 10a to lower part by being connected to the filter head 10 by being separated from the filter head 10 having the inserted inner 20, the filter body 30 including an inner key 33b detachably connected to the inner key guide 23 at upper part and a head key 33a detachably connected to the head key guide 13 at lower part; and the elastic member 40 being positioned between the filter head 10 and the inner 20 to keep the elasticity by moving of the inner 20 downwardly for filter head 10.

The filter head 10 forms a supporting frame for the filter body 30 by the detachable connecting of the filter body 30 and forms the inlet flow path 11a and the outlet flow path 12a of water for the bypass flow path 21 and purified water flow path 22. The inlet 11 forms an inlet flow path 11a at one side of the filter head 10 and the outlet 12 forms outlet flow path 12a at the opposite side of the filter head 10. The hollow area 10a is formed at an inside to connect the inlet 11 and the outlet 12 and to move the inner 20 upwardly and downwardly.

A head key guide 13 is formed at an inside face of the filter head 10 at which the head key 33a of the filter body 30 would be connected. The head key guide 13 is formed as a dual raised spot. Therefore, the head key guide 13 not only would be pushed upwardly with the rotation to connect the filter body 30 to the filter head 10 including the inserted inner 20 but also would be pulled downwardly with the rotation to separate the filter body 30 from the filter head 10 including the inserted inner 20.

The inner 20 is inserted to hollow area 10a of the filter head 10 to be capable of moving upwardly and downwardly. When the filter body 30 is connected to the filter head 10, the inner 20 moves to upper part by the filter body 30 at inside of the filter head 10. Therefore the purified water flow path 22 is connected to the inlet 11 and the outlet 12, so that the flow path is changed. When the filter body 30 is separated from the filter head 10, the inner 20 moves to lower part by the filter body 30 at inside of the filter head 10. Therefore the bypass flow path 21 is connected to the inlet 11 and the outlet 12, so that the flow path is changed. The bypass flow path 21 is formed at the upper part of the inner 20 and the purified water flow path 22 being connected to the filter body 30 is formed at the lower part of the bypass flow path 21.

The inner key guide 23 being connected to the inner key 33b of the filter body is formed at the inside of the inner 20.

To rapidly connect the inner 20 to the filter head 10 perpendicularly, a vertical guide hole 14 is formed at the inside of the filter head 10 in upward and downward direction and a guide pin 24 being connected to the vertical guide hole 14 is formed at the outside of the inner 20.

In preferred embodiment, a plurality of the vertical guide holes 14 are formed at the inside of the filter head 10 in a constant angle. And same amount of guide pins 24 are formed at the outside of the inner 20 in a same angle.

To keep the connected state of the inner inserted into the filter head 10, an inner locking hole 15 is formed at upper part of the filter head 10 with a lateral direction of the vertical guide hole 14. The inner locking hole 15 is vertically formed to guide the guide pin 24 vertically.

Because the inner locking hole 15 is vertically formed to guide the guide pin 24 vertically, when the inner 20 is connected to the filter head 10, if the inner 20 is rotated at the upper part of vertical guide hole 14 after pushing up the inner to move the guide pin 24 of the inner through the vertical guide hole 14 to upper part, the guide pin 24 would be inserted to the inner locking hole 15. And then, the guide pin 24 could be raised and lowered vertically just in the inner locking hole 15, so that the state of connecting the inner to the filter head 10 would be kept and the vertical movement of the inner 20 from the filter head 10 would be guided.

An undercut unit (not shown), at which the guide pin 24 is supported, is formed between the vertical guide hole 14 and the inner locking hole 15. After inserting the inner 20 into the filter head 10 by force, the separating the inner 20 from filter head 10 by the undercut unit could be prevented.

As shown FIG. 5, FIG. 17 and FIG. 18, a packing 25 is connected to the upper part of the bypass flow path 21 of the inner 20 and connected to the lower part of the purified water flow path 22 through the circumference of the outside of the inner 20. The O-ring 25a is connected to both end of the purified water flow path 22. Only if the purified water flow path 22 is connected to the inlet 11 and the outlet 12, the natural water could be flowed in. If the purified water flow path 22 is not connected to the inlet 11 and the outlet, when the inner 20 moves upwardly and downwardly, the flowing of the natural water through the purified water flow path 22 could be prevented.

As the inner 20 moves upwardly and downwardly in the hollow area 10a of the filter head 10, a ventilation hole 10b is formed at the upper part of the filter head 10 to prevent of moving of the inner 20 by the inner air pressure between the filter head 10 and the inner 20.

Because the ventilation hole 10b is connected to the hollow area 10a, when the inner 20 moves upwardly, the inside air of between the filter head 10 and the inner 20 flows out through the ventilation hole 10b. When the inner 20 moves downwardly, the outside air can flow between the filter head 10 and the inner 20 through the ventilation hole 10b.

The filter body 30 is detachably connected to the filter head 10 in which the inner 20 being inserted. When the inner 20 is connected to the filter head 10, the filter body 30 moves the inner 20 to upper part in the hollow area 10a of the filter head 10, so that the flow path is changed to be connected to the purified water flow path 22. When the inner 20 is separated from the filter head 10, the filter body 30 moves the inner 20 to lower part in the hollow area 10a of the filter head 10, so that the flow path is changed to be connected to the bypass flow path 21.

The inner key 33b being detachably connected to the inner key guide 23 is formed at the upper part of the filter body 30.

The head key 33a being detachably connected to the head key guide 13 is formed at the lower part of the filter body 30. A filter member being connected to the purified water flow path 22 to purify the water is formed at the inside of the filter body 30.

In the embodiment of the present invention, two of the head key 33a and two of the inner key 33b are formed with the space out in 180 degree. But only one or more than two could be possible with the space out in various angles.

In case of the filter head 10 and the inner 20, the height of the head key guide 13 is relatively higher than the height of the inner key guide 23.

As shown in FIG. 8 to FIG. 10, to connect the filter body 30, after inserting the inner key 33b to the inner key guide 23, the head key 33a rises up to the head key guide 13 and lifts the inner 20 by force. On the contrary to this, to separate the filter body 30, if the filter body 30 is rotated in the reverse direction, the head key 33a goes down through the head key guide 13, so that the inner 20 is pulled downwardly by the head key 33b. If the filter body 30 keeps being turned, the suspended state of the head key 33a and the inner key 33b is cleared, so the filter body 30 could be simply separate.

The radius of the rotary motion of the head key guide 13 is relatively bigger than the radius of the rotary motion of the inner key guide 23. When the head key 33a rotates through the head key guide 13, it can move with the gradual incline. Therefore, the rotational assembly and separation could be performed naturally.

As shown in FIG. 9 and FIG. 10, the head key guide 13 and the head key 33a could be formed with the various combinations. The head key guide 13 is formed as a dual raised spot including an inclined route and the head key 33a is formed as a protrusion including an inclined plane corresponding to the inclined route to move along to the head key guide. Therefore, the rotational assembly and separation of the filter body 30 could be performed naturally.

In the state of the head key 33a is located at the lower raised spot of the head key guide 13, if the filter body 30 is rotated and pushed up to upper part against the filter head 10 having the inserted inner 20, the head key 33a would be located at the upper raised spot of the head key guide 13 through the gradually inclined route, so that the filter body 30 is completely assembled.

In the state of the head key 33a is located at the upper raised spot of the head key guide 13, if the filter body 30 is rotated and pulled down to lower part against the filter head 10 having the inserted inner 20, the head key 33a would be located at the lower raised spot of the head key guide 13 through the gradually inclined route, so that the filter body 30 is completely separated.

As shown in FIG. 11, the head key guide 13 and the head key 33a could be formed with the various combinations. The head key guide 13 is formed as a dual raised spot including an inclined route and the head key 33a is formed as a protrusion including an oval cross-section corresponding to the inclined route to move along to the head key guide 13.

The head key 33a formed as a protrusion having the oval cross-section contacts only two points to the inside of the head key guide 13. When the filter body 30 is rotationally assembled and separated, it can move naturally and rapidly in the head key guide 13 formed as a dual raised spot including an inclined route.

In other words, in the state of the head key 33a is located at the lower raised spot of the head key guide 13, if the filter body 30 is rotated and pushed up to upper part against the filter head 10 having the inserted inner 20, the head key 33a would be located at the upper raised spot of the head key guide 13 through the gradually inclined route, so that the filter body 30 is completely assembled.

In the state of the head key 33a is located at the upper raised spot of the head key guide 13, if the filter body 30 is rotated and pulled down to lower part against the filter head 10 having the inserted inner 20, the head key 33a would be located at the lower raised spot of the head key guide 13 through the gradually inclined route, so that the filter body 30 is completely separated.

As shown in FIG. 12, the head key guide 13 and the head key 33a could be formed with the various combinations. The head key guide 13 is formed as a dual raised spot including an inclined route and the head key 33a is formed as a protrusion including a circular cross-section corresponding to the inclined route to move along to the head key guide 13.

The head key 33a formed as a protrusion having the circular cross-section contacts only two points to the inside of the head key guide 13. When the filter body 30 is rotationally assembled and separated, it can move naturally and rapidly in the head key guide 13 formed as a dual raised spot including an inclined route.

In other words, in the state of the head key 33a is located at the lower raised spot of the head key guide 13, if the filter body 30 is rotated and pushed up to upper part against the filter head 10 having the inserted inner 20, the head key 33a would be located at the upper raised spot of the head key guide 13 through the gradually inclined route, so that the filter body 30 is completely assembled.

In the state of the head key 33a is located at the upper raised spot of the head key guide 13, if the filter body 30 is rotated and pulled down to lower part against the filter head 10 having the inserted inner 20, the head key 33a would be located at the lower raised spot of the head key guide 13 through the gradually inclined route, so that the filter body 30 is completely separated.

As shown in FIG. 13, the head key guide 13 and the head key 33a could be formed with the various combinations. The head key guide 13 is formed as a dual raised spot including a circular route and the head key 33a is formed as a protrusion including an oval cross-section corresponding to the inclined route to move along to the head key guide 13.

The head key 33a formed as a protrusion having the oval cross-section contacts only two points to the inside of the head key guide 13. When the filter body 30 is rotationally assembled and separated, it can move naturally and rapidly in the head key guide 13 formed as a dual raised spot including an inclined route.

In other words, in the state of the head key 33a is located at the lower raised spot of the head key guide 13, if the filter body 30 is rotated and pushed up to upper part against the filter head 10 having the inserted inner 20, the head key 33a would be located at the upper raised spot of the head key guide 13 through the gradually inclined route, so that the filter body 30 is completely assembled.

In the state of the head key 33a is located at the upper raised spot of the head key guide 13, if the filter body 30 is rotated and pulled down to lower part against the filter head 10 having the inserted inner 20, the head key 33a would be located at the lower raised spot of the head key guide 13 through the gradually inclined route, so that the filter body 30 is completely separated.

As shown in FIG. 14, the head key guide 13 and the head key 33a could be formed with the various combinations. The head key guide 13 is formed as a dual raised spot including a circular route and the head key 33a is formed as a protrusion including an circular cross-section corresponding to the inclined route to move along to the head key guide 13.

The head key 33a formed as a protrusion having the circular cross-section contacts only two points to the inside of the head key guide 13. When the filter body 30 is rotationally assembled and separated, it can move naturally and rapidly in the head key guide 13 formed as a dual raised spot including an inclined route.

In the state of the head key 33a is located at the lower raised spot of the head key guide 13, if the filter body 30 is rotated and pushed up to upper part against the filter head 10 having the inserted inner 20, the head key 33a would be located at the upper raised spot of the head key guide 13 through the gradually inclined route, so that the filter body 30 is completely assembled.

In the state of the head key 33a is located at the upper raised spot of the head key guide 13, if the filter body 30 is rotated and pulled down to lower part against the filter head 10 having the inserted inner 20, the head key 33a would be located at the lower raised spot of the head key guide 13 through the gradually inclined route, so that the filter body 30 is completely separated.

As shown in FIG. 15, the head key guide 13 is formed as a dual raised spot including a vertical route having a length of the distance between the bypass flow path 21 and the purified water flow path 22 and the head key 33a can be formed as a protrusion including an circular cross-section corresponding to the inclined route to move along to the head key guide 13.

In the state of the head key 33a is located at the lower raised spot of the head key guide 13, if the filter body 30 is rotated against the filter head 10 having the inserted inner 20 and pushed up to upper part through vertical route and rotated again, the head key 33a would be located at the upper raised spot of the head key guide 13 through the route, so that the filter body 30 is completely assembled.

In the state of the head key 33a is located at the upper raised spot of the head key guide 13, if the filter body 30 is rotated with contrary direction against the filter head 10 having the inserted inner 20 and pulled down to lower part through vertical route and rotated again, the head key 33a would be located at the lower raised spot of the head key guide 13 through the gradually inclined route, so that the filter body 30 is completely separated.

As shown in FIG. 16, the head key guide 13 is formed as a dual raised spot including a vertical route having a length of the distance between the bypass flow path 21 and the purified water flow path 22 and the head key 33a can be formed as a protrusion including a rectangular cross-section, or vertical or polygonal cross-section corresponding to the inclined route to move along to the head key guide 13.

In the state of the head key 33a is located at the lower raised spot of the head key guide 13, if the filter body 30 is rotated against the filter head 10 having the inserted inner 20 and pushed up to upper part through vertical route and rotated again, the head key 33a would be located at the upper raised spot of the head key guide 13 through the route, so that the filter body 30 is completely assembled.

In the state of the head key 33a is located at the upper raised spot of the head key guide 13, if the filter body 30 is rotated with contrary direction against the filter head 10 having the inserted inner 20 and pulled down to lower part through vertical route and rotated again, the head key 33a would be located at the lower raised spot of the head key guide 13 through the gradually inclined route, so that the filter body 30 is completely separated.

The elastic member 40 is located between the filter head 10 and the inner 20. The elastic member biases the inner between the filter head and the inner to downward direction of the filter head. The inner 20 moves to downward direction of the filter head and can be biased to keep the position by the elastic member 40.

If the user pushes the inner 20 to the inside of the filter head 10 by mistake when the filter body 30 is separated from the filter head 10, the inner is pushed out to be the original position, so that the filter body can be rapidly combined to the filter head including the inner. The elastic member is formed as a coil spring in a preferred embodiment.

To locate the coil spring type elastic member 40 between the filter head 10 and the inner 20, the first spring supporter 16 is formed at the upper part of the inside of the filter head 10, so that the upper part of the elastic member 40 can be inserted and supported. The second spring supporter 26 is formed at the upper part of the inner 20, so that the lower part of the elastic member 40 can be inserted and supported.

The first spring supporter 16 and the second spring supporter 26 can be formed as a groove or a protrusion, so that the upper part and the lower part of the coil spring type elastic member 40 can be inserted and supported.

Based on FIG. 17 and FIG. 18, the whole operation of the filter assembly according to one embodiment of the present invention will be explained as below.

The flow path could be changed to the bypass flow path 21 or the purified water flow path 22, when the inner 20 moves upwardly and downwardly in the filter head 10 by combining or separating of the filter body 30 and filter head 10.

In other words, the head key 33a detachably connected to the head key guide 13 is formed at the upper part of the filter body 30 and the inner key 33b detachably connected to the inner key guide 23 of the inner 20 is formed at the lower part of the filter body 30.

To connect the filter body 30 to the purified water flow path, the filter body 30 is inserted to the filter head 10 and rotated as shown in FIG. 17. As shown in FIG. 18, the inner 20 inserted in the filter head 10 is lifted to upper part by the inner key 33b formed at the filter body 30, so that the flow path is changed to connect the purified water flow path 22 to the inlet 11 and the outlet 12.

On the contrary, to separate the filter body 30 from the purified water flow path, the filter body 30 is just rotated as shown in FIG. 17. The inner 20 inserted in the filter head 10 is pulled down by the inner key 33b formed at the filter body 30 by force, so that the flow path is changed to connect the bypass flow path 22 to the inlet 11 and the outlet 12.

The elastic member 40 is located between the filter head 10 and the inner 20. The elastic member 40 biases the inner 20 between the filter head 10 and the inner 20 to downward direction of the filter head 10. If the user pushes the inner 20 to the inside of the filter head 10 by mistake when the filter body 30 is separated from the filter head 10 as shown in FIG. 17, the inner 20 is pushed out to be the original position, so that the filter body 30 can be rapidly combined to the filter head 10 including the inner 20.

The invention claimed is:

1. A water filter assembly comprising:
    a filter head including an inlet formed at one side to receive water, an outlet formed opposite to the inlet to drain the water, the inlet and the outlet each communicating with a hollow area formed inside the filter head, and a head key guide formed in an inside face of the hollow area;
    an inner section comprising a bypass water flow path formed at an upper end, a purified water flow path formed adjacent to the bypass water flow path, and an inner key guide formed in an inside face of the inner section, the inner section being inserted to the hollow area of the filter head to move upwardly and downwardly;
    a filter body to complete a water flow connection for purified water by establishing a water flow path connection to the purified water flow path by moving the inner section upwardly within the hollow area when the filter body is engaged with the filter head having the inserted inner section and to complete a water flow connection for bypass water by establishing a water flow path to the bypass water flow path by moving the inner section downwardly within the hollow area when the filter body is disengaged from the filter head having the inserted inner section, the filter body including an inner key for detachably coupling to the inner key guide at an upper part of the filter body and a head key for detachably coupling to the head key guide at a lower part of the filter body;

a coil spring being positioned between the filter head and the inner section, to bias the inner section downwardly with respect to the filter head;

a vent formed in the filter head to let in and let out air;

a first spring support located at an upper part of the filter head; and a second spring support located at an upper face of the inner section, wherein the coil spring has a first end inserted in the first spring support and a second end inserted in the second spring support.

2. The filter assembly according to claim 1, wherein the height and the diameter of the head key guide are respectively greater than the height and the diameter of the inner key guide.

3. The filter assembly according to claim 1, further comprising:

a guide pin formed on an outer face of the inner section; and a vertical guide slot for receiving the guide pin, formed axially in an inside face of the filter head, wherein the inner section is assembled with the filter head by being axially inserted into the filter head.

4. The filter assembly according to claim 3, wherein an inner locking recess is vertically formed in the filter head above the vertical guide slot, to allow up and down movement of the guide pin.

5. The filter assembly according to claim 4, wherein the filter head further includes an undercut unit disposed between the vertical guide slot and the inner locking recess and the undercut unit is supported by the guide pin, and wherein the inner section is forcibly assembled into the filter head so that separation is prevented.

6. The filter assembly according to claim 1, wherein the head key guide is formed as a dual raised spot including an inclined route, and wherein the head key is formed as a protrusion including an inclined plane corresponding to the inclined route to move along the head key guide.

7. The filter assembly according to claim 1, wherein the head key guide is formed as a dual raised spot including an inclined route, and wherein the head key is formed as a protrusion having an oval cross-section to move along the head key guide.

8. The filter assembly according to claim 1, wherein the head key guide is formed as a dual raised spot including an inclined route; and wherein the head key is formed as a protrusion having a circular cross-section to move along the head key guide.

9. The filter assembly according to claim 1, wherein the head key guide is formed as a dual raised spot including a circular route, and wherein the head key is formed as a protrusion having an oval cross-section to move along the head key guide.

10. The filter assembly according to claim 1, wherein the head key guide is formed as a dual raised spot including a circular route, and wherein the head key is formed as a protrusion having a circular cross-section to move along the head key guide.

11. The filter assembly according to claim 1, wherein the head key guide is formed as a dual raised spot including a vertical route, and wherein the head key is formed as a protrusion having a circular cross-section to move along the head key guide.

12. The filter assembly according to claim 1, wherein the head key guide is formed as a dual raised spot including a vertical route, and wherein the head key is formed as a protrusion having a rectangular cross-section move along to the head key guide.

* * * * *